(12) United States Patent
Dunn

(10) Patent No.: US 8,967,371 B2
(45) Date of Patent: Mar. 3, 2015

(54) STUB SHAFT AND BEARING ASSEMBLY AND CONVEYOR IDLER ROLLER INCORPORATING SAME

(76) Inventor: Leslie Donald Dunn, Capella (AU)

( * ) Notice: Subject to any disclaimer, the term of this patent is extended or adjusted under 35 U.S.C. 154(b) by 335 days.

(21) Appl. No.: 13/147,315

(22) PCT Filed: Feb. 3, 2010

(86) PCT No.: PCT/AU2010/000099
§ 371 (c)(1),
(2), (4) Date: Aug. 1, 2011

(87) PCT Pub. No.: WO2010/088719
PCT Pub. Date: Aug. 12, 2010

(65) Prior Publication Data
US 2011/0284346 A1 Nov. 24, 2011

(30) Foreign Application Priority Data

Feb. 3, 2009 (AU) .................................. 2009900370
Jun. 22, 2009 (AU) .................................. 2009902877

(51) Int. Cl.
| | |
|---|---|
| B65G 39/09 | (2006.01) |
| B65G 39/12 | (2006.01) |
| F16C 13/02 | (2006.01) |
| F16C 19/18 | (2006.01) |
| F16C 19/38 | (2006.01) |
| F16C 33/60 | (2006.01) |

(52) U.S. Cl.
CPC .............. *B65G 39/09* (2013.01); *B65G 39/125* (2013.01); *F16C 13/02* (2013.01); *F16C 19/183* (2013.01); *F16C 19/38* (2013.01); *F16C 33/60* (2013.01)
USPC ........................................... 198/780; 198/789

(58) Field of Classification Search
USPC ........................... 198/780, 789; 193/37, 35 R
See application file for complete search history.

(56) References Cited

U.S. PATENT DOCUMENTS

| | | | |
|---|---|---|---|
| 2,018,949 A | 10/1935 | Couch | |
| 2,197,499 A | 4/1940 | Heinze | |
| 2,469,677 A | 5/1949 | Witthofft | |
| 2,593,089 A * | 4/1952 | Barry | ........................... 193/35 R |

(Continued)

FOREIGN PATENT DOCUMENTS

| | | |
|---|---|---|
| GB | 769107 A | 2/1957 |
| GB | 1389345 A | 4/1975 |

(Continued)

OTHER PUBLICATIONS

PCT App. No. PCT/AU2010/000099, International Search Report, Australian Patent Office, May 20, 2010 (5 pages).

(Continued)

*Primary Examiner* — Leslie A Nicholson, III
(74) *Attorney, Agent, or Firm* — Fay Sharpe LLP

(57) ABSTRACT

A stub shaft assembly (30) comprising a stub shaft or axle (14) and a bearing assembly for rotatably supporting the stub shaft or axle (14), the stub shaft or axle (14) having or being connected to a main body having a radially extending body (15) defining inner ball races (16) and a pair of outer members (12) defining outer ball races (22) with ball bearings (13) disposed between the inner and outer ball races (16, 22). In other embodiments the bearings are roller bearings. A conveyor idler roll is also disclosed which comprises a tubular shell mounted to a stub shaft assembly (30) at least at one end.

31 Claims, 10 Drawing Sheets

(56) References Cited

U.S. PATENT DOCUMENTS

| | | | | |
|---|---|---|---|---|
| 2,648,577 | A | * | 8/1953 | Thomas .......................... 193/37 |
| 2,696,283 | A | * | 12/1954 | Barry .......................... 193/35 R |
| 3,621,985 | A | * | 11/1971 | Pelzer .............................. 193/37 |
| 4,148,386 | A | * | 4/1979 | Bradbury ........................ 193/37 |
| 4,441,601 | A | * | 4/1984 | Rood .............................. 193/37 |
| 4,643,300 | A | | 2/1987 | Morrison |
| 5,507,094 | A | | 4/1996 | Lederman |
| 5,857,554 | A | * | 1/1999 | Toye .......................... 193/35 R |
| 6,044,965 | A | | 4/2000 | Clark |
| 6,419,070 | B1 | * | 7/2002 | Agnoff .......................... 198/780 |

FOREIGN PATENT DOCUMENTS

| | | |
|---|---|---|
| GB | 2004027 A | 3/1979 |
| GB | 2083572 A | 3/1982 |
| WO | 9926870 A1 | 6/1999 |
| WO | 2007108034 A2 | 9/2007 |
| WO | 2007108304 A1 | 9/2007 |
| WO | 2009049755 A1 | 4/2009 |

OTHER PUBLICATIONS

PCT App. No. PCT/AU2010/000099, International Preliminary Report on Patentability (Chapter II), Australian Patent Office, Dec. 22, 2010 (4 pages).

PCT App. No. PCT/AU2010/000099, Written Opinion of the International Searching Authority, Australian Patent Office, May 20, 2010 (11 pages).

English Bibiliography for PCT Patent App. Publication No. WO 2007/108304 A1, published Sep. 27, 2007, printed from Thomson Innovation on Feb. 4, 2014 (3 pages).

* cited by examiner

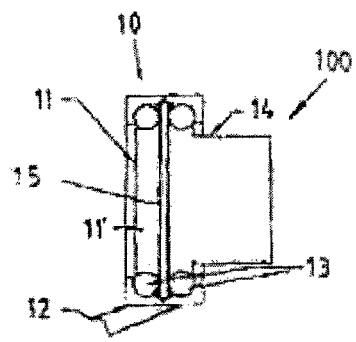
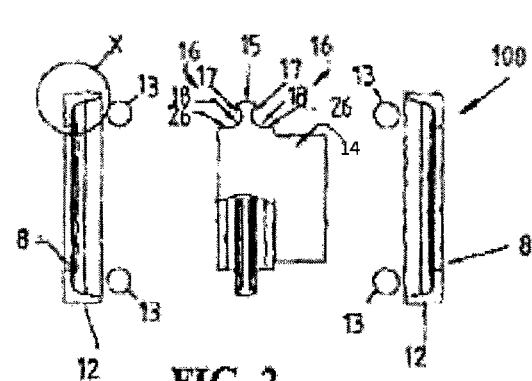
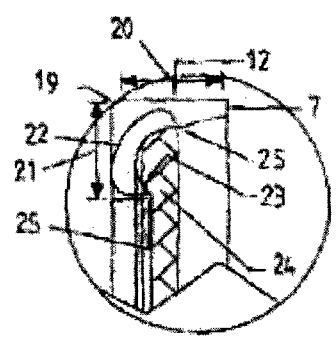
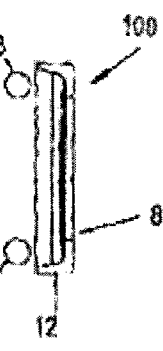
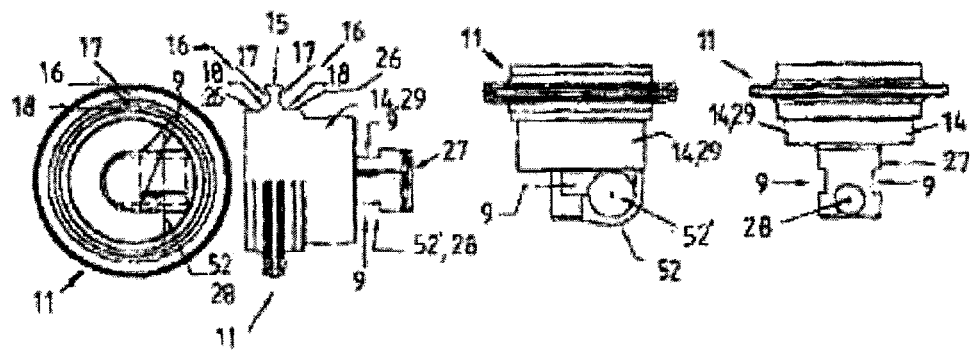
FIG. 1    FIG. 2    FIG. 3    FIG. 4    FIG. 5    FIG. 6    FIG. 7

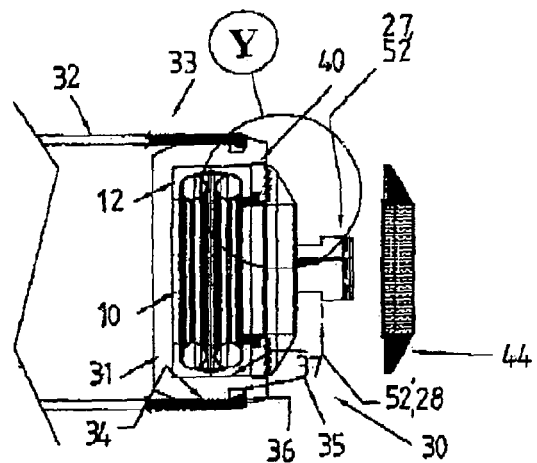
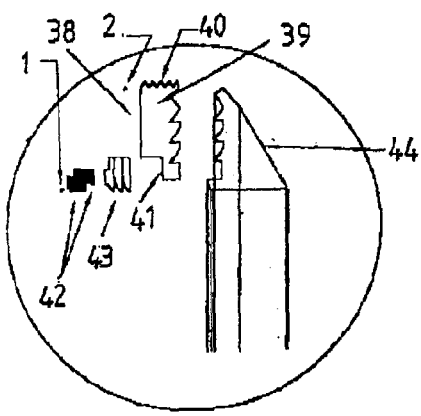
FIG. 10  FIG. 11
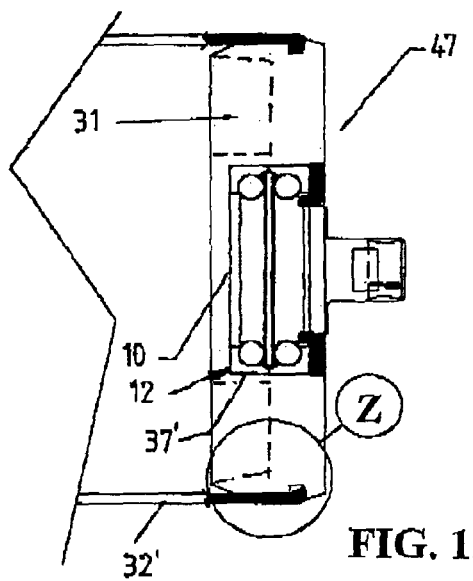
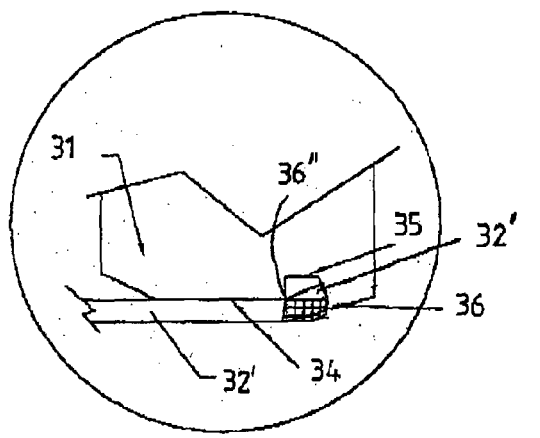
FIG. 12  FIG. 12(a)
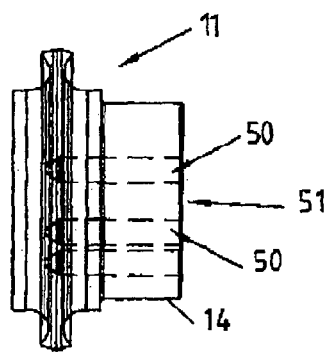
FIG. 13

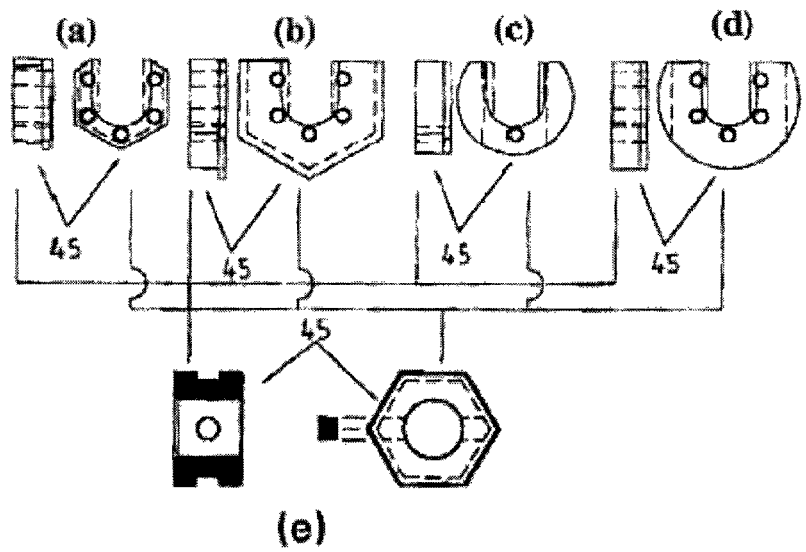
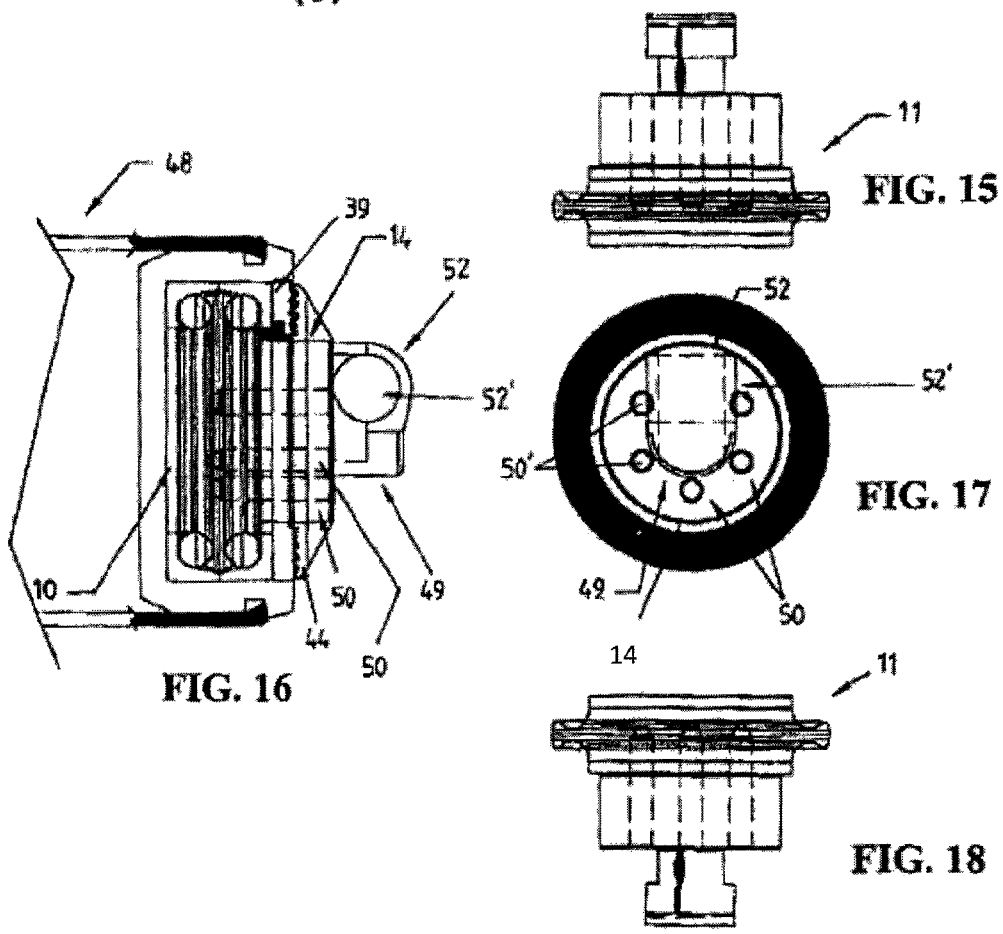

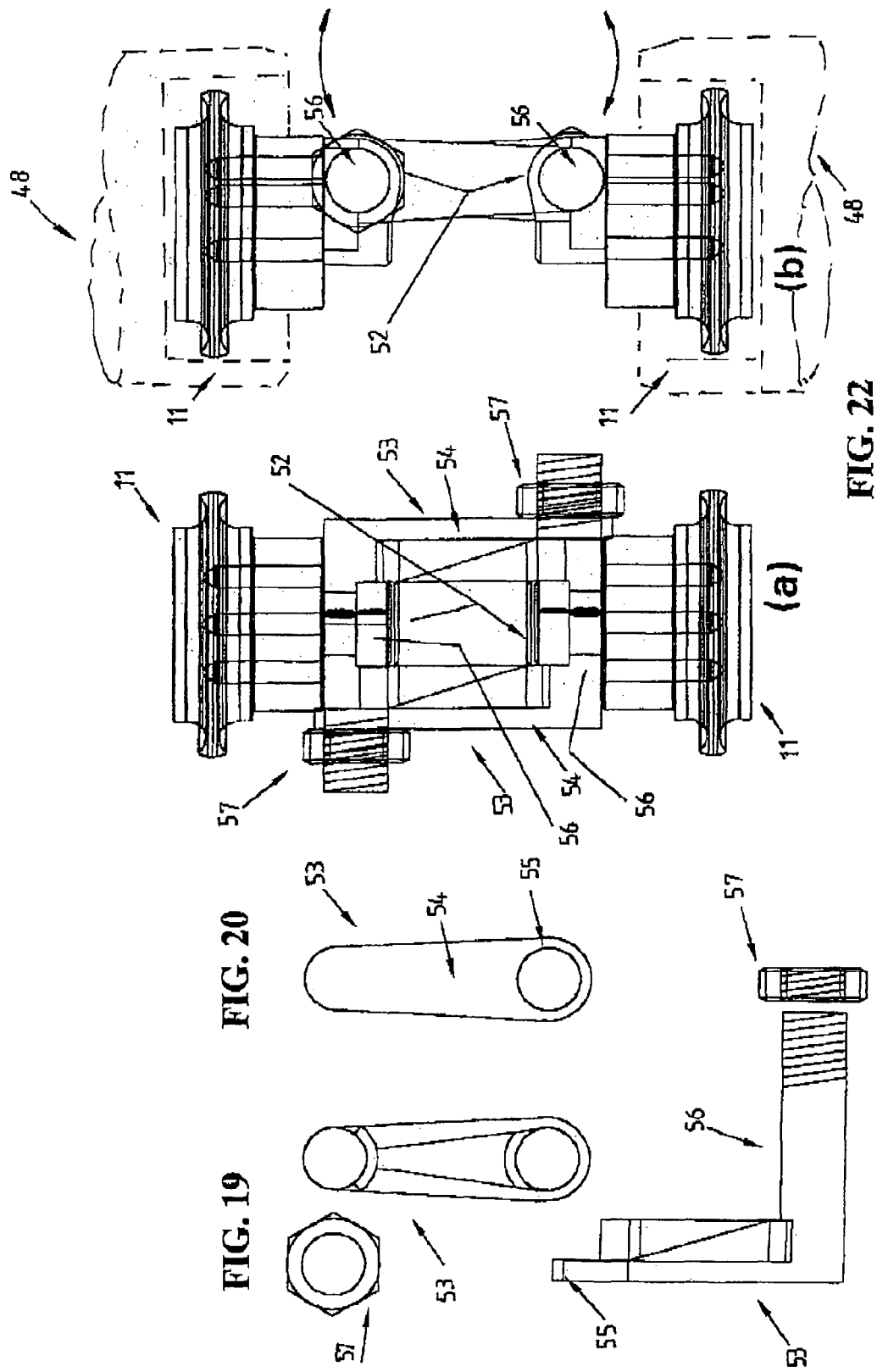

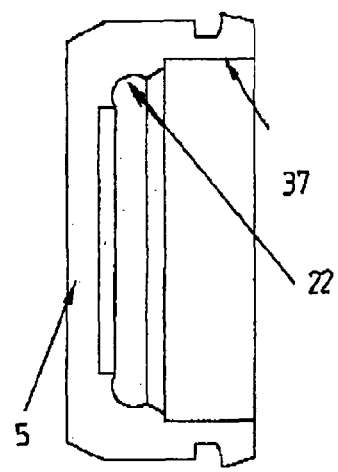
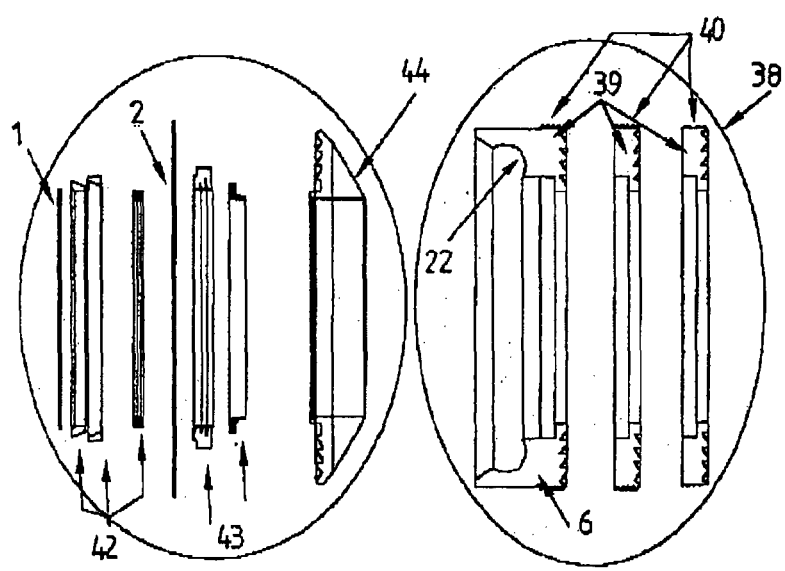
FIG. 25
FIG. 27  FIG. 26

STUB SHAFT AND BEARING ASSEMBLY AND CONVEYOR IDLER ROLLER INCORPORATING SAME

TECHNICAL FIELD

This invention relates to a stub shaft or axle assembly and a bearing assembly therefore and more particular to a hub assembly for a conveyor idler roll for use particularly but not exclusively in applications where bi-directional axial thrust loadings and radial loadings are encountered. The present invention in a further aspect relates to a conveyor idler roll incorporating a hub assembly.

BACKGROUND ART

Conventional bearings are designed to take pure radial loads, pure thrust loads or combination percentages of radial and thrust loads. A single row deep groove bearing incorporating bearing balls will take radial loads and some thrust loads and can be designed with angled contact surfaces to take increased thrust loads. A ball type bearing can also be configured to take thrust loads only whilst straight roller type bearings can take radial loads but cannot take thrust loads. Roller bearings can be configured with tapered rollers and can take radial or thrust loads or a combination percentages of radial and thrust loads however they are unsuited to taking bi-directional thrust loadings. When this type of load is encountered, it is necessary to use combinations of opposed tapered roller, axial contact ball, and barrel roller bearings.

Conveyor idler rolls as used for example in supporting conveyor belts in the mining industry include a tubular body and an axle which extends through the body and which is supported adjacent each end to the tubular body by bearings. Generally, the bearings used are conventional reduced friction plain, angular contact ball, deep grooved ball, roller or taper roller bearings. Separate thrust bearings may also be provided being located on the shaft with the inner races of the bearings being a part of or located on a stepped section of the shaft and held in position by thrust collars, circlips or nuts or alternatively being a pressed fit onto the shaft.

Conventional idler rolls which have axles extending through the body of the idler are of substantial weight raising issues relating to lifting and carrying weights under Occupational Work Place Health & Safety legislation.

As far as the applicant is aware, stub axle assemblies have not commonly been applied to use in conveyor idler roll application but if used their axial length would be vastly increased to accommodate bearing alignment constraints. Such assemblies would require back to back or opposed thrust bearings and/or combinations thereof with separators, spacer collars or shoulders on either axial shaft, hub/disc or both. Further, the bearing units would be required to be spaced apart to control axial and radial loadings when mounted to allow the rolling elements to carry the loadings required. Use of spaced apart separate bearing-units results in longer axial and radial dimensions and therefore an increase in overall volume. Standard 'off the shelf bearing units as used in this application would be required to be larger physically as the units have to absorb the 'analysis' forces, heat dissipation, wear characteristics, pressure distortion & contamination control.

SUMMARY OF THE INVENTION

The present invention aims to provide a hub and stub shaft assembly and in particular to a hub and stub shaft assembly for use in a conveyor idler roll assembly. The present invention in a further preferred aspect aims to provide a conveyor idler roll assembly including a hub assembly and stub shaft assembly which has reduced weight compared with conventional conveyor idler rolls but which does not sacrifice the strength and durability of conventional idler rolls. In yet a further preferred aspect, the present invention aims to provide an improved bearing assembly for use in a stub shaft assembly of the above type which is suitable for carrying both radial loads and bi-directional thrust loads. The stub shaft assembly and bearing assembly of the invention whilst particularly suited to use with conveyor idler rolls however may be applied to many other applications. Other objects and advantages of the invention will become apparent from the following description.

The present invention in a first preferred aspect provides an end hub assembly for a conveyor idler roll, said end hub assembly comprising an end hub having a body adapted to be received in an end of a hollow tubular shell of said idler roll, said body of said hub having an annular groove in its outer surface, said annular groove being adapted to receive a radially deformed swaged end of said shell for connection of said shell to said hub, a blind recess in said main body of said end hub, and a stub shaft assembly for supporting said hub, said stub shaft assembly comprising a main body and a bearing assembly, said bearing assembly being located within said recess, said bearing assembly comprising first and second spaced apart bearings, each said bearing comprising an inner bearing race formed in or on said main body and an opposing outer bearing race, and sets of rotatable or roll bearing elements arranged between respective said inner and outer bearing races, said bearing assembly being adapted to resist both radial loads and thrust loads in opposite directions.

In one embodiment, the bearing assembly comprising an inner bearing member having a pair of inner races, and a pair of outer bearing members, each defining respective outer races and sets of rotatable or roller bearing elements arranged between each said outer bearing member and said inner bearing-member in said inner and outer races. Most preferably, the inner ball races and outer ball races form axial thrust load races and radial load races.

Where the bearing elements comprise roller elements, the inner races may be angled to each other and the outer bearing members may be correspondingly angled. In a particularly preferred form; the inner bearing races are angled in an opposite direction to each other and the outer bearing races are corresponding angled. The rolling bearing elements may comprise cylindrical rollers or tapered rollers and the inner and outer races are angled to match the rolling surfaces of the cylindrical or tapered rollers. The surfaces of the races are preferably flat to define surfaces on which the rollers may roll and where the races are angled, the bearing assembly can carry thrust or radial loads. The inner hearing races and thus roller elements may be angled at an acute angle to each other or at an obtuse angle to each other.

In another embodiment, the bearing elements may comprise rollers or needle rollers and the bearing races may comprise pairs of opposing races of annular form and of a linear cross section to define flat races along which the sets of rollers may roll. The axes of rotation of the rollers may extend radially outwardly from the centre of the bearing assembly. The bearings in this configuration define thrust load bearings. Radial load may be resisted by a further set of rollers having their axes of rotation extending parallel to the axis of rotation of the main body of bearing assembly. The radial load bearing rollers may be provided between an annular race on the inner bearing member and opposing outer annular race, the surfaces of races being coaxial with the axis of rotation of main body of the bearing assembly.

Preferably, the inner bearing member includes a main body having an outer wall and the inner races are formed at least partially in or by the outer wall. Where the bearing elements are ball bearings, the inner-bearing member suitably also includes an annular load bearing wall arranged along a transverse plane of the bearing assembly and extending radially from the main body and suitably formed integrally therewith. The inner races are suitably provided on opposite sides of the annular wall and also preferably formed or defined partially in the annular wall.

The outer bearing members suitably comprise annular ring type members having outer annular cups in which are formed the outer races. The outer races suitably define a thrust load race and radial load race. The outer bearing members suitably are arranged to oppose each other with the rolling elements captured between the inner and outer bearing members within the inner and outer races. Means are suitably provided for positively locating the inner bearing members relative to the outer bearing members.

Preferably the stub shaft or axle is fixed to the inner bearing member of the bearing assembly and extends coaxially therefrom.

The stub shaft or axle may be in many different configurations to suit the application and may be secured to the inner bearing member in any suitable manner or formed integrally therewith. The bearing assembly may also be provided with respective stub shafts or axles which extend to opposite sides of the inner bearing member, the opposite stub shafts or axles being fixed to or formed integrally with the inner bearing member.

The inner bearing member may form or partially form part of a shaft or other rotatable member by being formed integrally therewith. Alternatively, the inner bearing member may be mounted to a shaft and for this purpose may be provided with a coaxial bore for receipt of the shaft which projects through the inner bearing member. One or both outer bearing members may also be formed as part of a housing or housings or other member/s arranged for rotation relative to the inner bearing member or shaft or other rotatable member carrying the inner bearing member. Thus one of the outer bearing members may be defined by an outer race formed within a bearing housing and the other outer bearing member may be defined by an outer race formed in a retainer engageable with the bearing housing.

The bearing assembly may also be provided with respective stub shafts or axles which extend to opposite sides of the inner bearing member, the opposite stub shafts or axles being fixed to or formed integrally with the inner bearing member.

The present invention in yet a further aspect provides a conveyor idler roll comprising at least one end hub assembly as described above and a hollow tubular shell, said body of said hub being located within said shell and wherein an end of said tubular shell is radially deformed or swaged such that it is forced into said annular groove and abuts one side surface of said groove whereby said idler roll can resist axial loads in a first direction.

Preferably the axially outermost radial annular surface of the groove is curved on a radius such that the end of the tubular shell follows that curve when swaged. This results in abutment between the end of the tubular shell and surface of the groove to provide high resistance to inwardly directed axial loads on the conveyor idler. The opposite or axially innermost surface of the annular groove forms with the outer surface of the hub or disc an annular edge about which the end of the shell is deflected during swaging to provide high resistance to outwardly directed axial loads on the conveyor idler.

The conveyor idler roll may be provided with a single stub shaft assembly at one end for cantilever type mounting of the idler roll. Alternatively, stub shaft assemblies may be provided at opposite ends of the roll for mounting the idler roll at each end. In this configuration, a plurality of idler rolls may be connected end to end to form a conveyor roller assembly of a catenary configuration, that is a series of conveyor rollers supported at each end and hanging between each end to follow a curved shape. For this purpose, connector means are provided between adjacent stub shafts or axles of adjacent idler rolls. The connector means are such as to allow the conveyor rolls to adopt the catenary configuration. Preferably for this purpose, the stub shafts or axles have transversely extending bores for cooperation with the connector means, the bores defining transverse pivot axes of the conveyor idlers. The connector means suitably comprise connecting links which have shafts or shanks which extend through the transversely extending bores. The shafts or shanks suitably extend substantially parallel to each other to define substantially parallel pivot axes for the conveyor rolls.

Suitably, the bearing recess of the hub has an internal diameter substantially the same as the external diameter of the or an outer bearing member of the bearing assembly to neatly receive the outer bearing member/s therein. The outer bearing member/s may be a press fit within the recess. Retainer means may be provided to retain the outer bearing member/s within the bearing recess. The retainer means suitably coats with the hub/disc and acts against the outer bearing member which is axially outermost relative to the recess adjacent its outer periphery. Preferably, the retainer means are externally threaded for cooperation with internal threads within the recess. Alternatively, the retainer means may be pressed into or alternatively held in the recess. The retainer means may include oil seal means for cooperation with and sealing against the inner-bearing member. The retainer means may also include dust seal means for cooperation with and sealing against the inner-bearing member or shaft extension thereof.

In an alternative arrangement and as referred to above, the bearing members may be formed as parts of the primary apparatus hub/disc and retainer to lower weight, volume and manufacturing cost further whilst providing a possible strength increase.

In yet a further aspect, the present invention provides a bearing assembly as used in the above described stub shaft assembly.

BRIEF DESCRIPTION OF THE DRAWINGS

In order that the invention may be more readily understood and put into practical effect, reference will now be made to the accompanying drawings which illustrate a preferred embodiment of the invention. The preferred embodiment has been described primarily in connection with a stub shaft or axle assembly in combination with an end hub of a conveyor idler roll however it should be understood that this description is by way of example only and the bearing assembly of the stub shaft assembly may be used in many different applications other than with stub shafts or axles. In the drawings: —

FIG. 1 illustrates in sectional elevation, a stub shaft assembly for use in a conveyor end hub assembly according to an embodiment of the invention;

FIG. 2 is an exploded view in side and sectional elevation, of the stub shaft assembly of FIG. 1;

FIG. 3 is an end elevation of an outer bearing member of the bearing assembly and associated ball bearings of the stub shaft assembly;

FIG. 4 is an end elevation of the inner-bearing member of the bearing assembly;

FIG. 5 is an enlarged view of the region X of the outer bearing member shown in FIG. 2

FIGS. 6(a), (b) and (c) illustrate in end, side elevation, and plan views, an inner bearing member provided with a mounting adapter for use in a catenary or slot mounting;

FIG. 7 illustrates in plan view an alternative shaft extension for use with the bearing assembly of the invention in a catenary or slot mounting;

FIG. 10 illustrates in sectional elevation, an application of the stub shaft assembly and hub assembly to a conveyor idler roll;

FIG. 11 is an enlarged view of the region Y of FIG. 10 of the bearing retainer with associated oil and dust seals;

FIG. 12 illustrates a conveyor idler roll of increased diameter provided with the stub shaft assembly according to an embodiment of the invention;

FIG. 12(a) is an enlarged view of the region Z of FIG. 12 showing the prepared shell tube, swage or moulded to the hub/disc or the idler roll;

FIG. 13 illustrates in side elevation an inner bearing member of the bearing assembly of the stub-shaft assembly with a shaft configured for attachment of mounting adaptors;

FIGS. 14 (a) to (d) illustrate in side and end elevation a set of multi-fit adapters to convert the stub shaft assembly of the idler roll from a CEMA (Conveyor Equipment Manufacturer's Association) 'B' slot shaft mounting through to CEMA 'G' mountings;

FIG. 14(e) illustrates in sectional elevation and end elevation a slot shaft nut type adapter for the idler roll;

FIG. 15 illustrates in sectional elevation a conveyor idler roll fitted with a further embodiment of hub and stub shaft assembly;

FIGS. 16, 17 and 18 illustrate in bottom, end and top view the inner member of the bearing assembly of the stub shaft assembly for use with the hub of FIG. 15;

FIG. 19 illustrates a link, for mounting the stub shaft assembly of a conveyor roll with associated securing nut;

FIG. 20 illustrates the link of FIG. 19 in opposite view;

FIG. 21 illustrates in side elevation, the link of FIGS. 19 and 20;

FIGS. 22 (a) and (b) illustrate in plan and side elevation assembled links mounted to the stub axles or shafts of a pair of opposite stub shaft assemblies of conveyor idler rolls;

FIG. 25 is a sectional view of a conveyor idler roll end hub or disc formed with an integral outer bearing member or cup;

FIG. 26 illustrates alternative bearing retainers;

FIG. 27 illustrates a group of seals for use with the bearing assembly of the stub shaft assembly.

DETAILED DESCRIPTION OF THE PREFERRED EMBODIMENT

Figure 8:
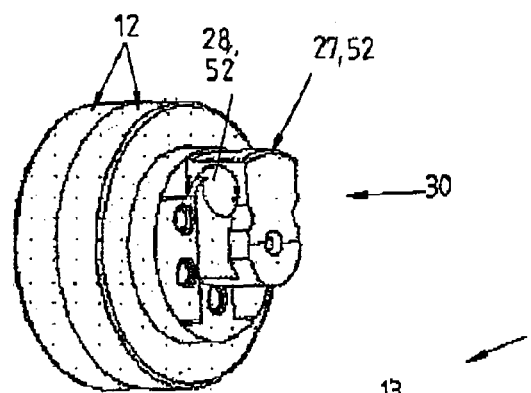
FIG. 8 is an isometric view of the stub shaft assembly of FIGS. 6 and 7 when assembled.

Referring to the drawings and firstly to FIGS. 1 to 5, there is illustrated a stub shaft assembly 100 for use in a conveyor roller end hub according to an embodiment of the invention, the stub shaft assembly 100 including a bearing assembly 10 comprising an inner bearing member 11, a pair of opposite outer bearing members or cups 12 on opposite sides of the inner bearing member 11 and a series of bearing balls 13 captured between each outer bearing member 12 and the inner bearing member 11. The inner bearing member 11 has an inner body 11' having an outer circumferential surface, the inner body 11' in this embodiment being extended axially on one side of the bearing assembly 10 to form a boss-like extension body 14 which comprises a stub shaft for the stub shaft assembly 100 which may be attached to a suitable mounting adaptor or supported directly to a frame as described further below. An annular load bearing member 15 is formed integrally with the body 11' and intermediate opposite axial ends of the body 11' and thus is arranged in a central radial plane of the bearing assembly 10. A pair of inner ball races 16 are provided on the inner bearing member 11 with each ball race 16 being formed partly in the annular member 15 as at 17 to serve as a thrust race for axial loads and partly in the outer circumferential surface of the main body 11' as at 18 to serve as an inner radial load race for radial loads.

Each outer bearing member or cup 12 is of an annular ring like form having an outer annular cup-like member 19 which has a radial extending portion 20 and an axial extending portion 21. Formed on the inner side of the member 19 and in the portions 20 and 21 is a bearing race 22 for cooperation with the bearing balls 13, the race 22 forming a thrust end race 23 and an outer radial load race 24 (see FIG. 5). The races 16 and 22 in the inner bearing member 11 and outer bearing members 12 are or part-circular form in cross section formed with a radius substantially the same as the radius of the bearing balls 13. The outer radial load race 24 has spaced lips 25 and similarly the inner radial load race has a lip 26 such that when the outer bearing members 12 are assembled with the inner bearing member 11 with the bearing balls 13 located therebetween, the balls 13 are captured between the inner member 11 and outer members 12. The body 14 of the inner bearing member 11 extends through the central opening 8 in one of the annular outer bearing members 12.

In the preferred assembly method, the outer members 12 may be heated to effect radial expansion thereof and/or the inner member 11 chilled to effect radial contraction thereof to permit the lips 26 of the inner members 11 to clear the bearing balls 13 installed in the outer members 12.

The bearing assembly 10 can act as both a thrust bearing to resist or carry axial thrust loadings in either direction and also radial loads in a compact and efficient structure. The assembly can be used in conjunction with or replace most types of conventional bearing units in primary apparatus units, which rotate or have rotating elements.

The outer bearing members 12 are preferably held tightly together as shown in FIG. 1 with or without spacing shims which may be provided at position 7 (see FIG. 5) between adjacent edges to control minimum rolling element clearances. The outer bearing members 12 are held together by suitable retainers, which act against the outer larger diameter portion of the members 12. Because the retainers act at a larger diameter, forces are minimised compared to the normal methods of retaining bearing elements on the smaller diameter region adjacent the shaft, which necessitates use of heavy-duty retainers.

The bearing balls 13 may be caged or separated by spacers. It is preferred however that the balls 13 have no cage as this allows for extra balls and extra surface area of contact and thereby loadings of greater proportions to be achieved. Ball to ball clearance in this configuration is minimal with the balls during the rotation action achieving rolling action in multiple planes thereby allowing the complete surface of every ball to experience rolling contact. This differs from a normal bearing where the wear pattern contact of the balls is in a single plane.

FIGS. 6 (a), (b) and (c) illustrate an inner bearing member 11 of the bearing assembly 10 of a stub shaft assembly provided with a shaft axle extension 27 configured for use in mounting of the bearing assembly 10 by means of a conventional slot mounting or catenary mounting. The shaft axle extension 27 extends coaxially from a shaft adaptor 29 similar to extension body 14 being fixed to or formed integrally with the inner bearing member 11. The shaft extension 27 includes slots 9 on opposite sides for conventional CEMA slot mounting or alternatively or additionally includes a mount bore 28 for engagement by a catenary link. In FIG. 7, the shaft extension 27 is of different configuration and also includes opposite slots 9 for conventional CEMA slot mounting and a mount bore 28 for the shank of a catenary link used as described further below.

Figure 9:
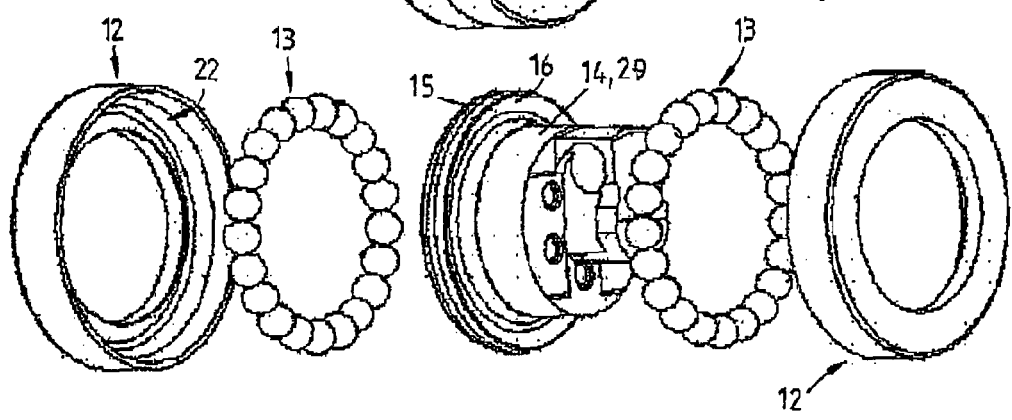
FIG. 9 is an exploded isometric view of the stub shaft assembly of FIG. 8.

The inner bearing member 11 of FIGS. 6(a), (b) and (c) is assembled with bearings 13 and outer bearing members or cups 12 to form the stub shaft assembly 30 of FIG. 8 shown in exploded view in FIG. 9.

In FIG. 10 (see also FIG. 12(a)), the stub shaft or axle assembly 30 is mounted in an end hub/disc 31 arranged in one or opposite ends of a shell tube 32 to form a conveyor idler roll 33, the end hub/disc 31 having a portion 34 of an external diameter substantially the same as the inner diameter of the shell tube 32. The end hub/disc 31 is further provided with an external annular groove 35 between the portion 34 and a stop location shoulder 36 defined by one axial side of the groove 35 which locates the end of the shell tube 32. The end of the shell tube 32 is swaged or moulded around the end hub/disc 31 and forced into the groove 35 to securely attach the shell tube 32 to the hub/disc 31. A similar arrangement can be provided at the opposite end of the shell tube 32 if required where the conveyor roll 33 is to be supported at each end. This arrangement allows for full strength of shell tubing 32 in both compression and tension mounting orientations as the axial end of the tube 32 abuts one side of the groove 35 and the end portion of the tube 32 rearwardly from the axial end bends about the edge defined by the intersection of the other side of the groove 35 and the outer surface of the end hub 31. The side of the groove 35 which terminates in or forms the shoulder 36 may be curved on a radius centred approximately at the opposite outer edge 36" of the groove 35 to accommodate inward deflection of the outer end 32' of the tube 32 about the edge 36" (from the unswaged position shown cross hatched in FIG. 12(a)). This is shown further in FIG. 34.

The hub/disc 31 further is provided with a blind bearing recess 37 of an internal diameter substantially the same as the external diameter of the outer bearing members or cups 12 for receiving the outer bearing members 12 which may be pressed into the recess 37. The recess 37 is closed on it inner side by a radial end wall 37'. A bearing retainer 38 is provided to retain the bearing assembly 10 in position in the recess 37. The bearing retainer 38 as shown more clearly in FIG. 11 comprises an annular body 39 which is threaded, pressed or swage engaged at 40 into the outer end of the bearing recess 37 and which has an annular groove 41 on its inner edge to receive an oil seal 42 which seals against the outer surface of the body 14. A dust seal 43 is also provided on the inner edge of the body 39 outwardly of the oil seal 42 which also seals against the outer surface of the body 14. The dust seal 43 may be incorporated with or designed to aid the seal 42 in control of lubrication retention. An external water or dust contaminant deflector seal 44 can also be provided in the form of a frustoconical cap on the outer side of the bearing retainer 38. An O-ring seal 1 or the like is provided adjacent the oil seal 42 to face seal against a shoulder between the body 14 and inner bearing member 11. An O-ring seal 2 provides a seal between the outer bearing member or cup 12 and retainer 38. It will be apparent that the retainer 38 acts against the larger diameter outermost outer bearing member 12 which means that axial loadings over the area of contact on the retainer 38 are reduced.

The shell tube 32 may be of various diameters and wall thickness using plastic deformable or moldable materials for engagement with the end hub/disc 31. In FIG. 12, the end hub/disc 47 is of increased diameter as is the shell tube 32' however, the bearing assembly 10 is retained in a bearing recess 37' in the end hub/disc 47 in the same manner as described above and the shell tube 32' is swaged to or moulded to the end hub/disc 47 as before and as shown in FIG. 12(a). The hub/disc 31 may also be cut-away as shown in dotted outline in FIG. 12 to reduce weight and to facilitate manufacture. Corrosion paint can be applied after crimp swaging or moulding but preferably before bearings and seals are fitted.

FIG. 13 illustrates an inner bearing member 11 of the bearing assembly 10 including shaft extension body 14 provided with a plurality of location holes 50 which are drilled or threaded into the body 14 and which extend parallel to the axis of the body 14. This configuration allows for end face mounting of the body 14 for example by bolting or screwing into the holes 50 through side plates or frames of a conveyor. Alternatively, the body 14 may be fitted with various mounting adaptors 45 for example of the type shown in FIGS. 14 (a) to (d). The mounting adaptors 45 may be secured to the body 14 by means of suitable fasteners engaged through aligned holes in the adaptors 45 and holes 50 in the body 14 for converting the stub shaft assembly 100 having the extension body or shaft 14 for use in a conventional CEMA (Conveyor Equipment Manufacturer's Association) 'B' slot shaft mounting through to a CEMA 'G' mounting. The adaptor 45 of FIG. 14 (e) comprises a slot shaft hexagon nut type adaptor which may be for example engaged with the shaft 27 of FIG. 7 and secured thereto by means of a grub screw. The adaptor 45 is then supported in a conventional manner to a frame mount of a conveyor idler roll.

FIG. 15 illustrates the end of a conveyor idler roll 48 similar to that described previously with reference to FIG. 10. The bearing assembly 10 which is the same type as that described with reference to FIGS. 1 and 2 includes body or stub shaft 14 extending from the inner bearing member 11 which carries mounting adaptor 49 which may be secured by screw/pin fasteners 50' to holes 50 in the body 14. The adaptor 49 carries a mounting 52 having a transverse bore 52' therein for mounting the roll 48 using a catenary link system. The mounting adapter 49 and/or extensions may be formed integrally with the inner bearing member 11. The frustoconical cap seal 44 as in FIG. 10 serves as a water and dust contaminant seal and seals against the bearing retainer 38 engaged in the bearing recess in the end hub/disc of the roll 48 and also seals against the outer cylindrical surface of the body 14.

Referring now to FIGS. 19 to 21, there is illustrated a link 53 for connecting conveyer idler rollers in a catenary configuration, the rollers being fitted at adjacent ends with stub shaft assemblies having mounting adapters 27 or 52 of the type illustrated in FIGS. 6, 7 and 15 to 17 having mount bores 28 or 52'. The link 53 is of crank-like form comprising a main arm 54 having a bore 55 at one end and a shank 56 extending parallel to the bore axis at the other end of the arm 54. The shank 56 may be threaded for threaded engagement with a nut or alternatively be provided with a pin or pin hole for connection to a pin or castellated lock washer or retainer. Pairs of links 53 are arranged opposite each other such that the shank or shaft 56 of one link 53 passes through the bore 55 of the opposite link 53 for attachment thereto by a nut 57 to the shank 56. The shanks 56 also pass through the bores 52' in mountings 52 or bores 28 in the mounting shafts 27 such that the adapter 52/28 of the inner bearing member 11 of each bearing assembly mounted to the end of a conveyor idler roll is captured to the links 53 as shown in FIG. 22. The adaptors 52/28 and attached bearing assemblies 10 and idler rollers 48 associated therewith however are free for some limited pivotal movement about the axes of the shanks 56 which extend substantially normal to the longitudinal axes of the rollers 48 and as indicated by the double ended arrows in FIG. 22(b) to enable them to have their longitudinal axes angled relative to each other to adopt the catenary form. The pivotal movement of the rolls 48 is defined by the axis of the shanks 56 which extend substantially parallel to each other.

Figure 23:
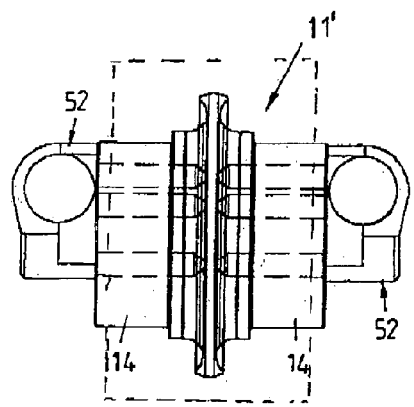
FIG. 23 is a side elevation of a double-ended stub shaft assembly according to a further embodiment of the invention.
Figure 24:
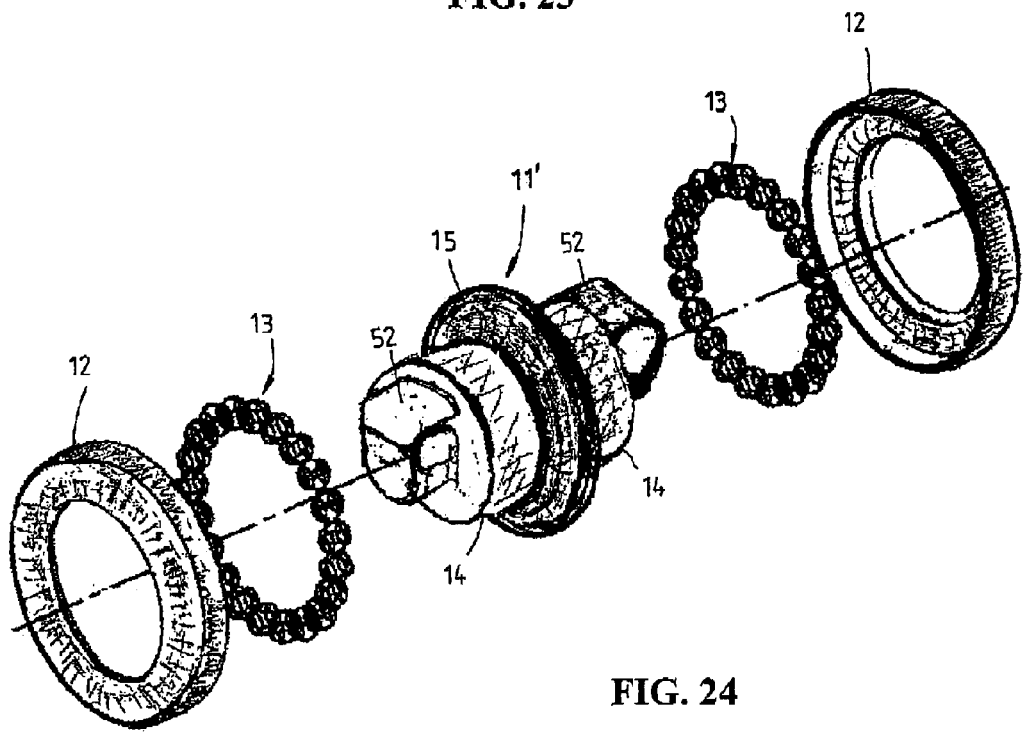
FIG. 24 is an isometric exploded view of a double-ended stub shaft assembly of the type shown in FIG. 23.

FIG. 23 illustrates a further configuration of stub shaft assembly according to a further preferred aspect of the invention in which opposite stub shafts are provided on opposite sides of a central bearing assembly 10. In this configuration the inner bearing member 11 is provided with extension bodies or shafts 14 on opposite sides defining a double stub shaft assembly with adaptors 52 mounted on or forming part of the bodies 14. The inner bearing member 11' is assembled with bearing balls 13 on either side of the annular member 15 and outer bearing members 12 on opposite sides of the member 15. The bearing assembly thus formed in this configuration can support a wheel-type idler (shown in dotted outline) in FIG. 23 for use in particular conveyor applications.

The outer bearing members or cups 12 may be either separate members as described above or alternatively, at least one of the outer members or cups 12 may be formed integrally with a body to be supported by the bearing assembly. FIG. 25 illustrates a modified end hub or disc 5 of a conveyor idler roll in which one of the outer bearing members or cups 12 is formed integrally. Thus the bearing outer race 22 is formed integrally within the hub or disc 5. The other outer bearing member or cup 12 may be of the type shown in FIGS. 1 and 2 and held within the bearing recess 37 of the hub or disc 5 by a retainer 40 pressed or threaded into position. The modified end hub or disc 5 may be secured to the shell of the idler roll in the same manner as described above. The other outer bearing member or cup 12 may be formed as part of or comprise a retainer shown in FIG. 26, the outer race 22 being formed integrally within the member 12 and thus the retainer. The member/retainer 12 can be pressed or threaded into the bearing recess 37 as before in a hub 5 of the type shown in FIG. 25 or in the hubs 32 or 32' of FIGS. 10 and 12.

FIG. 26 illustrates two other forms of annular bearing retainers 39 and 40. The outer surface of retainer 39 is threaded for threaded engagement in the bearing recess whilst the outer surface of retainer 40 is plain for pressing into the bearing recess.

FIG. 27 illustrates the different forms of seals which may be used in connection with the bearing assembly 10 and retainer 12, 39 or 40 therefor. The seals 1 and 2 comprise O-ring or ring seals, the seals 42 being inner seals serving as a seal against lubricant contamination, and the seals 43 dust seals: The seal 44 comprises an external deflector contaminant shield.

Figure 28:
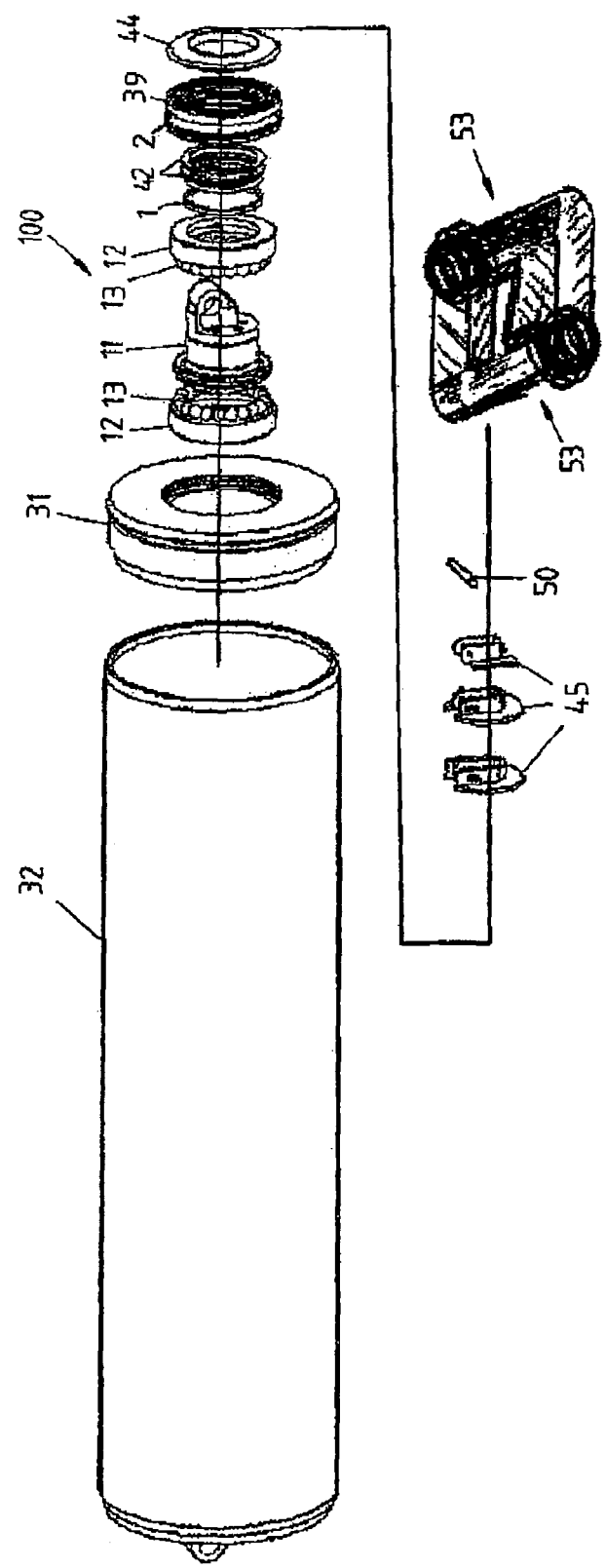
FIG. 28 is an isometric exploded view of a conveyor idler roll comprising a hub, a stub shaft assembly and idler roll shell with adaptors and catenary link.

FIG. 28 illustrates in exploded view the typical arrangement of the components of the stub shaft assembly 100 associated with a shell tubes 32 of a conveyor idler and bearing assembly of the type shown in FIGS. 8 and 9 with one of a selection of adaptors 45 for mounting of the stub shaft assembly 100 and idler to a conveyor frame and catenary links 53 for catenary mounting.

The embodiment of stub shaft assemblies described above use ball bearings however roller bearings including tapered roller bearings may be used. Thus the inner ball races 16 may be planar to define surfaces on which roller bearings may roll and the opposing outer races 22 may comprise planar races. Thus with rollers provided between the planar races 16 and 22 on opposite sides of the central member 15 with the rollers having rotational axes extending in a radial direction, thrust forces in opposite axial directions are resisted. The central member 15 may be provided with a planar race in its outer surface upon which further rollers may roll, these rollers having rotational axes substantially parallel to the central axis of the stub shaft assembly. An outer coaxial bearing member may be provided around the central member 15 and define on its inner surface a planar race opposing the race on outer surface of the central member with rollers captured therebetween. These rollers will thus resist radial forces.

Figure 29:
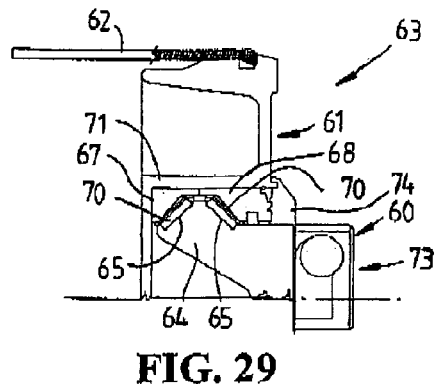
FIG. 29 is a half sectional view of a conveyor roll provided with a hub and stub shaft assembly having tapered roller bearings.
Figure 30:
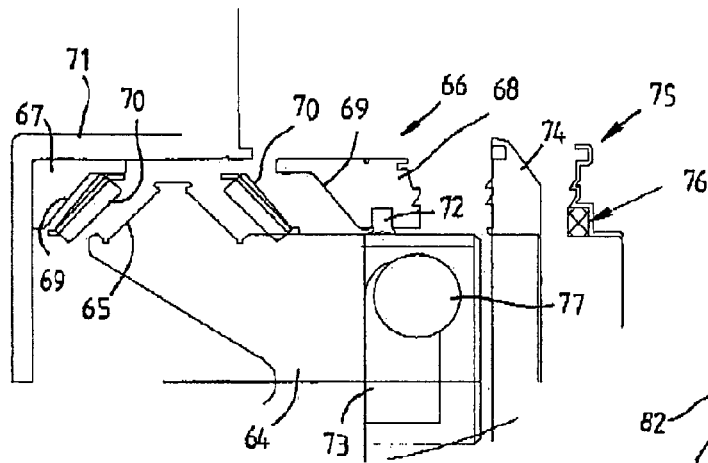
FIG. 30 is an enlarged exploded view of the hub and stub shaft assembly of FIG. 29.
Figure 34:
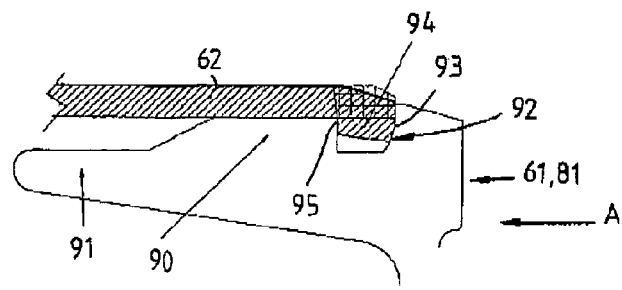
FIG. 34 illustrates the connection between the roll shell and end hub of the conveyor roll.

FIGS. 29 and 30 illustrate in half-sectioned and exploded view respectively, a further stub shaft assembly 60 mounted to an end hub or disc 61 according to another embodiment of the invention to which a tubular shell 62 is connected as in FIG. 12(a) and as also shown in FIG. 34 to form a conveyor idler roll 63. The stub shaft assembly 60 includes an inner bearing member 64 having opposite bearing races 65 which are angled in opposite directions, the bearing member 64 comprising part of a bearing assembly 66. The bearing races 65 have substantially flat surfaces and are angled to each other at substantially 90 degrees. The bearing races 65 however may be at an acute angle or obtuse angle to each other. The bearing assembly 66 also includes a pair of annular outer bearing members 67 and 68 which define outer hearing races 69 which are angled to each other and which oppose the inner races 65. Tapered roller bearings 70 are provided between the inner and outer races 65 and 69. The bearing assembly 66 by the configuration of the races 65 and 69 and rollers 70 can resist both axial thrust loadings and radial loadings. The rollers and races however may be in an opposite configuration to that shown in FIGS. 29 and 30. That is the inner and outer 65 and 69 races and rollers 70 may be angled inwardly towards each other.

The outer bearing member 67 is a press fit in a recess 71 in the bearing hub 61 as is the bearing member 68 and the bearing member 68 carries in an inner annular recess, an inner annular seal 72 which acts against the outer surface of the bearing member 64 which is extended to form a stub shaft extension 73. The stub shaft assembly 60 also includes a dust seal 74 which seals against an annular outer surface of the bearing member 68 whilst a weather seal 75 alternatively may be provided to seal the bearing assembly 66, the weather seal 75 having an annular sealing member 76 suitably of felt or similar material which can seal against the end of the bearing member 68 and shaft extension 73. The shaft extension 73 may also include a transverse opening 77 for a catenary connection as described above.

Figure 31:
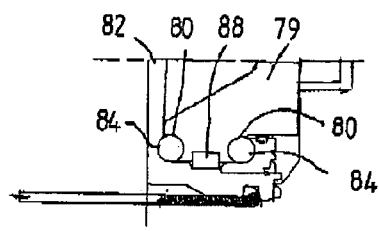
FIG. 31 is a half sectional view of a conveyor idler roll provided with a hub and stub shaft assembly having a combination of ball bearings and roller bearings.
Figure 32:
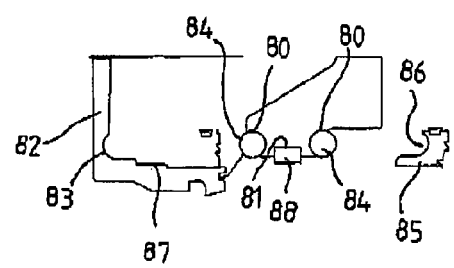
FIG. 32 is an exploded view of the stub shall assembly of FIG. 31.

The embodiment of a bearing assembly for use in a stub shaft assembly of a conveyor idler roll as shown in FIGS. 31 and 32 includes an inner bearing member 79 having opposite inner ball bearing races 80 of part circular cross section and an annular outer roller race 81 which is flat in cross section. The end hub 82 of the conveyor idler roll forms an outer bearing member and is formed in an inner corner thereof with an outer race 83 of part circular cross section which opposes one of the races 80 such that bearing balls 84 can be captured therebetween. A further annular outer bearing member 85 is formed with an outer race 86 of part circular cross section which opposes the other of the races 80 with further bearing balls 84 captured therebetween. The bearing denoted by the balls 84 and races 80, 83 and 86 resist axial thrust loadings.

The hub 82 additionally has formed therein an inner annular race 87 of planar cross section which opposes the race 81 and cylindrical rollers 88 are captured between the races 81 and 87. The bearing defined thereby resists radial loads. The bearing member 85 is a press fit in the hub 82 as shown in FIG. 31 assisted with the aid of heat if required. The cylindrical rollers 88 alternatively may comprise any rolling or low-friction bearing element material for example a bush or ball bearing.

Figure 33:
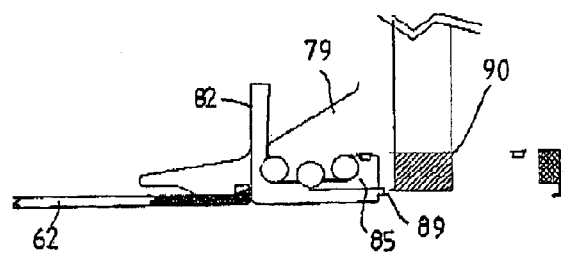
FIG. 33 illustrates in sectional exploded view a typical method of assembly of the bearings of the stub shaft assembly to the hub or disc of the conveyor idler roll.

FIG. 33 illustrates an alternative method of securing the bearing member 85 with the hub 82. The hub 82 for this purpose is provided with a leading inner annular tip portion 89. After placement of the bearing member 85 within the hub 82, an annular tool 90 is moved axially towards the hub 82 to engage the tip portion 89 to swage the tip portion 89 by deflecting it radially inwardly which will retain the bearing member 85 in position.

The hub 82 (and hub 61) is formed with a load annular land 90 as shown in FIG. 34 for a conveyor roller with a light shell 62. Thus the inner face of the shell 62 has an inner diameter substantially the same as the outer diameter of the land 90 such that the shell 62 may be forced over the land 90 which will thus support the end of the shell 62. The hub 81 (and hub 61) also however have an inwardly stepped land 91 inwardly of the land 90 of reduced external diameter for supporting shells 62' of greater wall thickness.

As in the previous embodiments, the hub 61 (and 81) as shown in FIG. 34 are provided with an annular groove 92 as in FIG. 12 (*a*) with a curved leading end 93 into which an end of the shell 62 is swaged or otherwise force inwardly to force an end portion 94 of the shell 62 into the groove 92. In this position, the annular end wall of the shell 62 abuts the curved leading end 93 of the groove 91 to resist axial loadings in the direction A. Further as the deformed end portion 94 of the shell 62 is forced over the outer edge 95 on the trailing side of the groove 92, axial loadings in the direction opposite the direction A will also be resisted through cooperation of the edge 95 with the deformed end portion 94.

Figure 35:
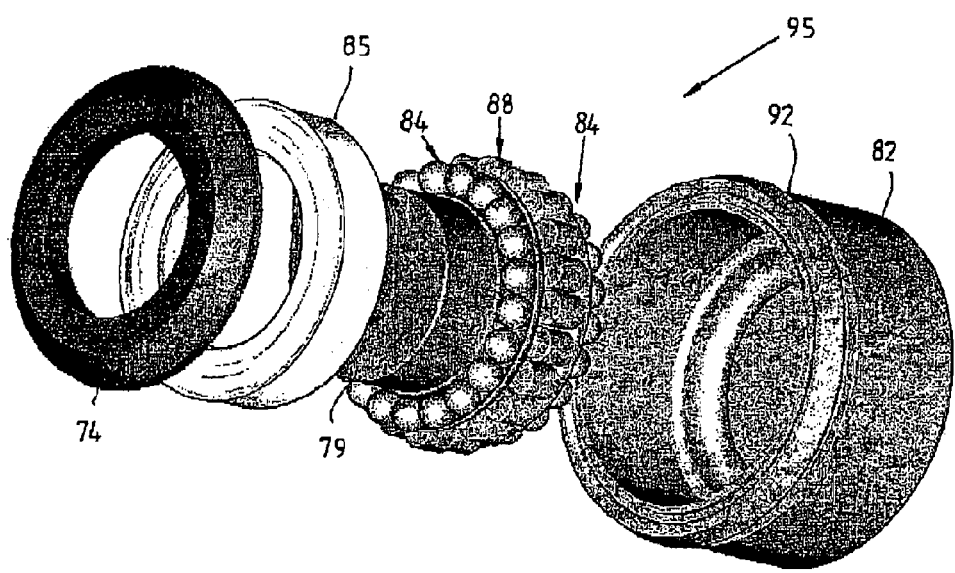
FIG. 35 is an exploded isometric view of a stub shaft assembly similar to that of FIG. 9 but using the bearing assembly similar to that of FIGS. 31 and 32.

FIG. 35 illustrates a stub shaft assembly 95 similar to that as used in FIGS. 31 and 32 but showing the components in exploded isometric view. Thus like components to the components of the assembly of FIGS. 31 and 32 have been given like numerals. The hub 82 is engaged with a tubular shell as in FIG. 34 to form a conveyor idler roll. Alternatively the stub shaft assembly 95 may be used in other applications as referred to below.

The bearing assembly of the stub shaft assemblies described above may be used in many different applications such as in roller skate wheels, bicycle wheels, windmill fans, idler gears, tensioner sprockets/rollers, drum rollers, ground engaging tooling, elevator conveyor guide rolls, mono/multiple track overhead or ground crane type units, machine track idlers, digger chain idler rolls, guide idler rolls, tracking idler rolls, impact idler rolls, idler wheel rolls, guide wheel rolls, sprocket or belt tension or guide idler roll/wheels, fan wheel idler discs, wheel idlers, track idler roller/wheels, gear idlers, slew ring idler tracks, chain wheel/roller idlers, and hub idler roller/wheels. The smaller size of the bearing assembly and the ability of the bearing assembly to carry greater loadings than conventional bearings in the same size configuration reduces overall equipment weight whilst maintaining the inherent strengths.

The bearing assembly has primarily been described in an application involving stub axles or shafts. The bearing assembly however may be used in many other applications where stub axles or shafts are not employed. Thus far example and with reference to FIGS. 1 to 4, the member 11' of the inner bearing (and the body 14) may be centrally apertured to receive a shaft therethrough in the manner of conventional bearings. Alternatively, the extending body 14 may be eliminated.

The terms "comprising" or "comprises" as used throughout the specification and claims are taken to specify the presence of the stated features, integers and components referred to but not preclude the presence or addition of one or more other feature/s, integer/s, components or group thereof.

Whilst the above has been given by way of illustrative embodiment of the invention, all such variations and modifications thereto as would be apparent to persons skilled in the art are deemed to fall within the broad scope and ambit of the invention as herein defined in the appended claims.

The invention claimed is:

1. An apparatus for a conveyor idler roll, said apparatus comprising
   an end hub having a hub body adapted to be received in an end portion of a tubular shell of said idler roll, said body of said end hub having an outer land of a substantially constant external diameter substantially the same as an inner diameter of the end of the tubular shell to enable said end hub to support the end of the tubular shell, said hub body having an annular groove in its outer surface, said annular groove being adapted to receive a radially deformed outer end of said tubular shell as the outer end is swaged into the annular groove for connection of said tubular shell to said end hub,
   a blind recess in said hub body, and
   a stub shaft assembly for supporting said end hub, said stub shaft assembly comprising
      a main body and
      a bearing assembly, said bearing assembly being located within said blind recess, said bearing assembly comprising first and second spaced apart bearings, each said bearing comprising
an inner bearing race formed in or on said main body,
an opposing outer bearing race, and
sets of rotatable or roll bearing elements arranged between respective said inner and outer bearing races,
said bearing assembly being adapted to resist both radial loads and thrust loads in opposite directions.

2. The apparatus as claimed in claim 1 wherein said annular groove is defined between opposite side surfaces comprising an axially outermost annular surface and an axially innermost annular surface and
wherein the deformed swaged outer end of said tubular shell is adapted to abut said outermost annular surface to resist axial loads in a first inward axial direction.

3. The apparatus as claimed in claim 2 wherein said axially innermost annular surface of said groove forms with the outer surface of the hub body, an annular edge about which the outer end of the tubular shell is deformed during swaging to provide resistance to outwardly directed axial loads.

4. The apparatus as claimed in claim 2 wherein said outermost annular surface is curved on a radius substantially centered on said annular edge.

5. The apparatus as claimed in claim 1 wherein said hub body has further inwardly stepped lands rearwardly of said outer land and of external diameters reduced progressively of said outer land whereby said further inwardly stepped lands can support an increased wall thickness in the tubular shell.

6. The apparatus as claimed in claim 1 wherein said inner and outer races are of part circular form in cross section and said bearing elements comprise bearing balls between said inner and outer races.

7. The apparatus as claimed in claim 1 and including
an annular load bearing wall extending radially from said main body assembly and
wherein said inner bearing races are formed partially in said main body and partially in said annular load bearing wall to define radial load races and axial thrust load races respectively.

8. The apparatus as claimed in claim 1 and including
a further set of roll bearing elements between said first and second bearings, the axes of said roll bearing elements extending parallel to an axis of rotation of the main body, and
inner and outer bearing races for said roll bearing elements on said main body and an inner surface of said blind recess respectively.

9. The apparatus as claimed in claim 1 wherein said bearing elements comprise rolls and
wherein said inner races of said first and second bearings are angled oppositely to each other relative to an axis of said bearing assembly and
wherein said outer races are correspondingly angled such that said rolls are receivable between said inner and outer races.

10. The apparatus as claimed in claim 1 wherein one of said outer bearing races of said first and second bearings is defined by a first outer annular bearing member, said first outer annular member being axially outermost relative to said blind recess.

11. The apparatus as claimed in claim 10 wherein another of said outer bearing races is defined by a second outer annular member or is formed integrally with said hub body.

12. The apparatus as claimed in claim 11 wherein one or both of said outer bearing members are a press fit in said blind recess.

13. The apparatus as claimed in claim 10 including
a retainer for retaining said bearings in said blind recess and
annular sealing means between said retainer and said main body to seal said blind recess.

14. The apparatus as claimed in claim 13 wherein said retainer acts against or is defined by said first outer annular bearing member.

15. The apparatus as claimed in claim 13 and including
a dust seal externally of said retainer and engaged therewith to seal said blind recess from dust entry.

16. The apparatus as claimed in claim 1 and including
a shaft extension extending from said main body, said shaft extension including
slots on opposite sides for engagement with a mounting adaptor for mounting of said shaft extension to a mounting frame.

17. The apparatus as claimed in claim 16 wherein said shaft extension includes a transverse opening for engagement by a catenary link.

18. The apparatus as claimed in claim 1, further comprising:
the tubular shell, the end portion of the tubular shell configured to receive the hub body of the end hub, wherein the combined end hub and stub shaft assembly is positioned within the tubular shell at the end portion;
wherein an outer end of the tubular shell is swaged to the combined end hub and stub shaft assembly after the combined end hub and stub shaft assembly is positioned within the end portion of the tubular shell such that the radially deformed outer end of the tubular shell is forced into the annular groove of the hub body and abuts one side surface of the annular groove whereby the idler roll can resist axial loads in a first direction.

19. A conveyor idler roll comprising
a first end hub assembly, comprising:
an end hub with a hub body having an annular groove in its outer surface;
a blind recess in the hub body; and
a stub shaft assembly for supporting the end hub, the stub shaft assembly comprising:
a main body; and
a bearing assembly located within the blind recess, the bearing assembly comprising:
first and second spaced apart bearings, each bearing comprising:
an inner bearing race formed in or on the main body;
an opposing outer bearing race; and
sets of rotatable or roll bearing elements arranged between the respective inner and outer bearing races for each bearing;
wherein the bearing assembly is configured to resist both radial loads and thrust loads in opposite directions; and
a tubular shell with first and second end portions, each end portion configured to receive the first end hub assembly, wherein said first end hub assembly is positioned within said tubular shell at the first end portion;
wherein said body of said end hub has an outer land of substantially constant external diameter substantially the same as an inner diameter of the first end portion of the tubular shell to enable said end hub to support the first end portion of the tubular shell;

wherein a first outer end of said tubular shell within the first end portion is swaged to the first end hub assembly after the first end hub assembly is positioned within the first end portion of the tubular shell such that the radially deformed first outer end of the tubular shell is forced into said annular groove of the first end hub assembly and abuts one side surface of said annular groove whereby said idler roll can resist axial loads in a first direction.

20. The conveyor idler roll as claimed in claim 19 wherein said first outer end of said tubular shell is deformed about an edge defined between the other side surface of said groove and the outer surface of said hub body of the corresponding end hub assembly whereby said idler roll can resist axial loads in a direction opposite said first direction.

21. The conveyor idler roll as claimed in claim 19 and including
a second end hub assembly mounted at a second outer end of the tubular shell within the second end portion to form the conveyor idler roll.

22. The conveyor idler roll as claimed in claim 19 wherein each annular groove is defined between opposite side surfaces comprising an axially outermost annular surface and an axially innermost annular surface;
wherein the corresponding deformed swaged first outer end of the tubular shell is configured to abut the outermost annular surface to resist axial loads in a first inward axial direction.

23. The conveyor idler roll as claimed in claim 22 wherein the axially innermost annular surface of the groove forms with the outer surface of the hub body, an annular edge about which the first outer end of the tubular shell is deformed during swaging to provide resistance to outwardly directed axial loads in a direction opposite the first direction.

24. The conveyor idler roll as claimed in claim 22 wherein the outermost annular surface is curved on a radius substantially centered on the annular edge.

25. A method of manufacturing a conveyor idler roll, comprising:
assembling first and second bearings to form a first stub shaft assembly with a first bearing assembly, each first and second bearing comprising an inner bearing member with an inner bearing race formed therein, two outer bearing members with outer bearing races formed therein, and sets of rotatable or roll bearing elements, wherein the outer bearing members are arranged in opposing fashion on opposite sides of the inner bearing member to hold the sets of rotatable or roll bearing elements captive between the respective inner and outer bearing races;
assembling a first end hub assembly from the first stub shaft assembly and an end hub, the end hub comprising a hub body with an annular groove in its outer surface and a blind recess within which the first bearing assembly of the first stub shaft assembly is positioned;
positioning the first end hub assembly within a first end portion of a tubular shell, the first end portion configured to receive the first end hub assembly; and
swaging an outer end of the first end portion of the tubular shell to the first end hub assembly, wherein the outer end of the first end portion of the tubular shell is radially deformed during the swaging such that the outer end is forced into the annular groove of the first end hub assembly and abuts one side surface of the groove whereby the idler roll can resist axial loads in a first direction.

26. The method as claimed in claim 25 wherein the outer end of the first end portion of the tubular shell is deformed about an edge defined between the other side surface of the annular groove and the outer surface of the hub body of the first end hub assembly whereby the idler roll can resist axial loads in a direction opposite the first direction.

27. The method as claimed in claim 25, further comprising:
forming a second end hub assembly from a second end hub and a second stub shaft assembly with a second bearing assembly, the two end hub assemblies mounted at opposite outer ends of the tubular shell to form the conveyor idler roll.

28. The method as claimed in claim 25 wherein the deformed swaged end of the tubular shell is configured to abut the outermost annular surface to resist axial loads in a first inward axial direction.

29. The method as claimed in claim 25 wherein each annular groove is defined between opposite side surfaces comprising an axially outermost annular surface and an axially innermost annular surface;
wherein the corresponding deformed swaged end of the tubular shell is configured to abut the outermost annular surface to resist axial loads in a first inward axial direction.

30. The method as claimed in claim 29 wherein the axially innermost annular surface of the groove forms with the outer surface of the hub body, an annular edge about which the end of the tubular shell is deformed during swaging to provide resistance to outwardly directed axial loads in a direction opposite the first direction.

31. The method as claimed in claim 29 wherein the outermost annular surface is curved on a radius substantially centered on the annular edge.

* * * * *